United States Patent
Kim et al.

(10) Patent No.: US 11,902,753 B2
(45) Date of Patent: Feb. 13, 2024

(54) SOUND REPRODUCING APPARATUS AND VEHICLE HAVING THE SAME

(71) Applicants: Hyundai Motor Company, Seoul (KR); Kia Corporation, Seoul (KR)

(72) Inventors: Kichang Kim, Suwon-Si (KR); Taekun Yun, Anyang-Si (KR); Dong Chul Park, Anyang-Si (KR); Eunsoo Jo, Hwaseong-Si (KR); Jinsung Lee, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 198 days.

(21) Appl. No.: 17/680,010

(22) Filed: Feb. 24, 2022

(65) Prior Publication Data
US 2022/0400336 A1 Dec. 15, 2022

(30) Foreign Application Priority Data
Jun. 9, 2021 (KR) ........................ 10-2021-0074673

(51) Int. Cl.
*H04R 3/00* (2006.01)
*G10K 11/175* (2006.01)
*G06F 3/16* (2006.01)

(52) U.S. Cl.
CPC .............. *H04R 3/00* (2013.01); *G06F 3/165* (2013.01); *G10K 11/175* (2013.01); *H04R 2430/01* (2013.01); *H04R 2499/13* (2013.01)

(58) Field of Classification Search
None
See application file for complete search history.

(56) References Cited

U.S. PATENT DOCUMENTS 10,266,112 B1 4/2019 Lee et al.
2021/0201885 A1* 7/2021 Bastyr .............. G10K 11/17873

FOREIGN PATENT DOCUMENTS

| JP | H10277263 A | 10/1998 |
| JP | 20050134885 A | 5/2005 |
| JP | 2018036494 A | 3/2018 |
| KR | 10-1744716 B1 | 6/2017 |
| KR | 10-2018-0020399 A | 2/2018 |
| KR | 10-1856935 B1 | 5/2018 |

(Continued)

*Primary Examiner* — Kenny H Truong
(74) *Attorney, Agent, or Firm* — MORGAN, LEWIS & BOCKIUS LLP

(57) ABSTRACT

A vehicle includes a speed detecting device provided to detect a driving speed, a pressure detecting device provided to detect a pressure applied to a brake pedal, a power information obtaining device provided to obtain power information of a power device, and a sound reproducing apparatus provided to determine whether the vehicle is in a start state or a driving state according to driving speed information detected by the speed detecting device, pressure information detected by the pressure detecting device, and the power information, control reproduction of post-combustion noise when the processor concludes that the vehicle is in the start state, control reproduction of a slip sound in response to an acceleration command or a deceleration command when the vehicle is in the driving state, and control reproduction of an acceleration sound corresponding to an acceleration force when the vehicle is accelerating in the driving state.

20 Claims, 12 Drawing Sheets

(56) References Cited

FOREIGN PATENT DOCUMENTS

| KR | 10-2020-0081765 A | 7/2020 |
| KR | 10-2131390 B1 | 7/2020 |
| KR | 10-2227110 B1 | 3/2021 |

* cited by examiner

FIG. 3

| Setting |
|---|
| ○ PERSONAL |
| ○ SPORTS |
| ○ PERFORMANCE |
| ○ TCR (or RALLY) |

EVENT SOUND : TCR

EVENT SOUND : RALLY

SOUND REPRODUCING APPARATUS AND VEHICLE HAVING THE SAME

CROSS-REFERENCE TO RELATED APPLICATION(S)

The present application claims priority to Korean Patent Application No. 10-2021-0074673, filed on Jun. 9, 2021, the entire contents of which is incorporated herein for all purposes by this reference.

BACKGROUND OF THE PRESENT DISCLOSURE

Field of the Present Disclosure

The present disclosure relates to a sound reproducing apparatus of reproducing a sound in response to an engine operation and a vehicle having the same.

Description of Related Art

Among sound reproducing apparatuses, an engine sound generator (ESG) or an engine sound equalizer (ESE) is an apparatus of generating various engine sounds in response to an engine operation.

An existing engine sound generator is mounted on an upper end portion of a cowl structure through a metal bracket. An upper end portion of a cowl-structured cowl panel (also referred to as a 'cowl top cover') is disposed to overlap a lower end portion of a windshield glass. In the instant case, a gap between the upper end portion of the cowl panel and the lower end portion of the windshield glass is sealed through a glass sealer.

The engine sound generator generates vibration along an axial direction thereof, and at the instant time, the vibration generated by the engine sound generator is transmitted to the windshield glass side through the cowl structure of a vehicle body. Accordingly, a rattle problem, a timbre problem, and the like occur.

Furthermore, because the vibration generated by the engine sound generator is transmitted to the windshield glass side through the glass sealer, a transmission efficiency of vibration is lowered, and application conditions such as a cost and weight of the engine sound generator become disadvantageous.

Furthermore, there is a case where an adhesive is applied between the lower end portion of the windshield glass and the upper end portion of the cowl panel to prevent the rattle problem, but in the instant case, the transmission efficiency of vibration is further lowered due to the adhesive.

Furthermore, as the vibration generated by the engine sound generator is transmitted to the cowl structure, there is a problem of poor resonance quality in which resonance occurs in the cowl panel and peripheral portions of the cowl structure. For example, when a bracket is coupled to the cowl panel through welding, a length of the bracket becomes relatively long so that the transmission efficiency of vibration may be relatively lowered, and it is difficult for a welding gun to enter the cowl panel and bracket side.

Furthermore, noise is generated from a welding portion of the bracket on which the engine sound generator is provided and the cowl panel, and quality costs for structural reinforcement and vibration isolation are excessively incurred.

The information disclosed in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a sound reproducing apparatus configured for reproducing a post-combustion noise in response to a starting situation, a slip sound in response to acceleration and deceleration situations, and an acceleration sound in response to an acceleration force, and a vehicle having the same.

It is an aspect of the present disclosure to provide a sound reproducing apparatus configured for correcting a slip sound and an acceleration sound in response to user-specific acceleration and deceleration patterns, and a vehicle having the same.

Additional aspects of the present disclosure will be set forth in part in the description which follows, and in part, will be obvious from the description, or may be learned by practice of the present disclosure.

In accordance with an aspect of the present disclosure, a sound reproducing apparatus includes a communication network configured to receive vehicle state information, and a processor configured to determine whether a vehicle is in a start state or a driving state according to the vehicle state information received through the communication network, control reproduction of post-combustion noise when the processor concludes that the vehicle is in the start state, control reproduction of a slip sound in response to an acceleration command or a deceleration command when the processor concludes that the vehicle is in the driving state, and control reproduction of an acceleration sound corresponding to an acceleration force when the processor concludes that the vehicle is accelerating in the driving state.

The vehicle state information may include at least one of driving speed information, engine information, brake pedal pressure information, and shift information.

The sound reproducing apparatus may further include an input device configured to receive at least one of sound volume information and timbre information on sound reproduction, wherein the processor, when controlling the reproduction of the post-combustion noise, may adjust at least one of a sound volume and a timbre of the post-combustion noise according to the at least one of the sound volume information and the timbre information received in the input device, and control reproduction of the adjusted post-combustion noise.

The sound reproducing apparatus may further include a memory configured to store information on a plurality of slip sounds, wherein the processor may obtain a first pressing pattern in which a brake pedal of the vehicle is pressed and a second pressing pattern in which an accelerator pedal of the vehicle is pressed, according to the vehicle state information, and store information on a first slip sound corresponding to the obtained first pressing pattern and a second slip sound corresponding to the obtained second pressing pattern among the plurality of slip sounds, in the memory.

The processor, when the deceleration command is received, may adjust a timbre of the first slip sound based on a slip rate of each wheel of the vehicle and control reproduction of the adjusted first slip sound.

The processor, when the acceleration command is received, may adjust a timbre of the second slip sound based on the slip rate of each wheel of the vehicle and controls reproduction of the adjusted second slip sound.

The processor may identify at least one information of wheel speed information, yaw rate information, and acceleration information of each wheel in the vehicle state information, and obtain the slip rate of each wheel according to the identified at least one information.

The processor, when controlling the reproduction of the acceleration sound, may identify at least one information of engine rpm, a torque of an engine, and a throttle opening amount of the engine of the vehicle state information, obtain an acceleration force according to the identified at least one information, and correct a sound pressure of the acceleration sound according to the obtained acceleration force.

The processor may correct the sound pressure of the acceleration sound when the acceleration force is equal to or less than a first acceleration force or exceeds a second acceleration force higher than the first acceleration force.

The sound reproducing apparatus may further include a memory, and an input device configured to receive user identification information, wherein the processor may identify at least one information of engine rpm, a torque of an engine, and a throttle opening amount of the engine of the vehicle state information, obtain an acceleration pattern for each user according to the identified at least one information and the user identification information, correct a sound pressure of an acceleration sound for each user according to a difference in sound pressure comparing the sound pressure of the acceleration sound corresponding to the acceleration pattern for each user and a basic sound pressure, and store information on the corrected sound pressure of the acceleration sound in the memory.

The sound reproducing apparatus may further include a microphone, an acceleration detector, and a speaker, wherein the processor may generate a noise canceling signal based on a signal received in the microphone, an acceleration signal detected by the acceleration detector, and a sound output from the speaker, and control an output of the generated noise canceling signal.

In accordance with an aspect of the present disclosure, a vehicle includes a speed detecting device configured to detect a driving speed, a pressure detecting device configured to detect a pressure applied to a brake pedal, a power information obtaining device configured to obtain power information of a power device, and a sound reproducing apparatus configured to determine whether the vehicle is in a start state or a driving state according to driving speed information detected by the speed detecting device, pressure information detected by the pressure detecting device, and the power information, control reproduction of post-combustion noise when the sound reproducing apparatus concludes that the vehicle is in the start state, control reproduction of a slip sound in response to an acceleration command or a deceleration command when the sound reproducing apparatus concludes that the vehicle is in the driving state, and control reproduction of an acceleration sound corresponding to an acceleration force when the sound reproducing apparatus concludes that the vehicle is accelerating in the driving state.

The vehicle may further include an input device configured to receive at least one of sound volume information and timbre information on sound reproduction, wherein the sound reproducing apparatus, when controlling the reproduction of the post-combustion noise, may adjust at least one of a sound volume and a timbre of the post-combustion noise according to the at least one of the sound volume information and the timbre information received in the input device, and control reproduction of the adjusted post-combustion noise.

The sound reproducing apparatus, when controlling the reproduction of the slip sound, may control reproduction of a first slip sound when it is determined that the deceleration command is received in response to pressing of a brake pedal, and control reproduction of a second slip sound when it is determined that the acceleration command is received in response to pressing of an accelerator pedal.

The sound reproducing apparatus may identify at least one information of wheel speed information, yaw rate information, and acceleration information of each wheel of the vehicle and obtains the slip rate of each wheel based on the identified at least one information, and adjust a timbre of the first slip sound based on the obtained slip rate of each wheel when controlling the reproduction of the first slip sound and adjusts a timbre of the second slip sound based on the obtained slip rate of each wheel when controlling the reproduction of the second slip sound.

The power device may include an engine and further include a transmission.

The sound reproducing apparatus, when controlling the reproduction of the acceleration sound, may identify at least one information of engine rpm, a torque of an engine, and a throttle opening amount of the engine, obtain an acceleration force according to the identified at least one information, and correct a sound pressure of the acceleration sound according to the obtained acceleration force.

The sound reproducing apparatus may correct the sound pressure of the acceleration sound when the acceleration force is equal to or less than a first acceleration force or exceeds a second acceleration force higher than the first acceleration force.

The vehicle may further include a memory, and an input device configured to receive user identification information, wherein the sound reproducing apparatus may identify at least one information of engine rpm, a torque of an engine, and a throttle opening amount of the engine, obtains an acceleration pattern for each user according to the identified at least one information and the user identification information, correct a sound pressure of an acceleration sound for each user according to a difference in sound pressure comparing the sound pressure of the acceleration sound corresponding to the acceleration pattern for each user and a basic sound pressure, and store information on the corrected sound pressure of the acceleration sound in the memory.

The vehicle may further include a microphone, an acceleration detector, and a speaker, wherein the sound reproducing apparatus may generate a noise canceling signal based on a signal received in the microphone, an acceleration signal detected by the acceleration detector, and a sound output from the speaker, and control an output of the generated noise canceling signal.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 is an exemplary diagram of a sound reproduction mode reproduced through the sound reproducing apparatus according to an exemplary embodiment of the present disclosure;

Figure 1:
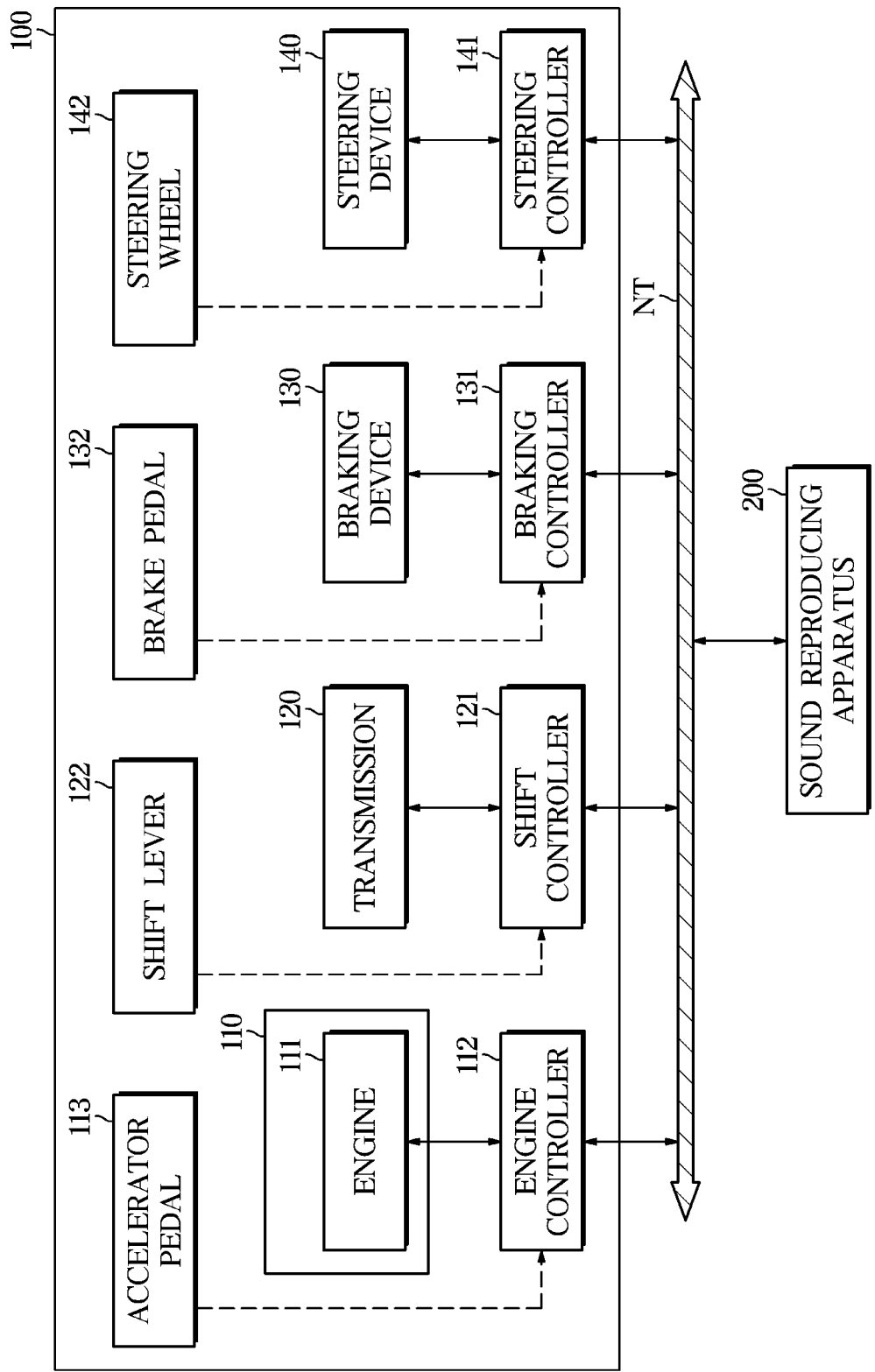
FIG. 1 is an exemplary view of a vehicle in which a sound reproducing apparatus according to an exemplary embodiment of the present disclosure is provided.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the specification, like reference numerals refer to like elements. This specification does not describe all the elements of the embodiments, and duplicative contents between general contents or embodiments in the technical field of the present disclosure will be omitted. The terms 'part,' 'module,' 'member,' and 'block' used in this specification may be embodied as software or hardware, and it is also possible for a plurality of 'units,' 'modules,' 'members,' and 'blocks' to be embodied as one component, or one 'unit,' 'module,' 'member,' and 'block' to include a plurality of components according to exemplary embodiments.

Throughout the specification, when a part is referred to as being "connected" to another part, it includes not only a direct connection but also an indirect connection, and the indirect connection includes connecting through a wireless network.

Furthermore, when it is described that a part "includes" an element, it means that the element may further include other elements, not excluding the other elements unless specifically stated otherwise.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states an order.

Hereinafter, the present disclosure will be described in detail with reference to the accompanying drawings.

Figure 2:
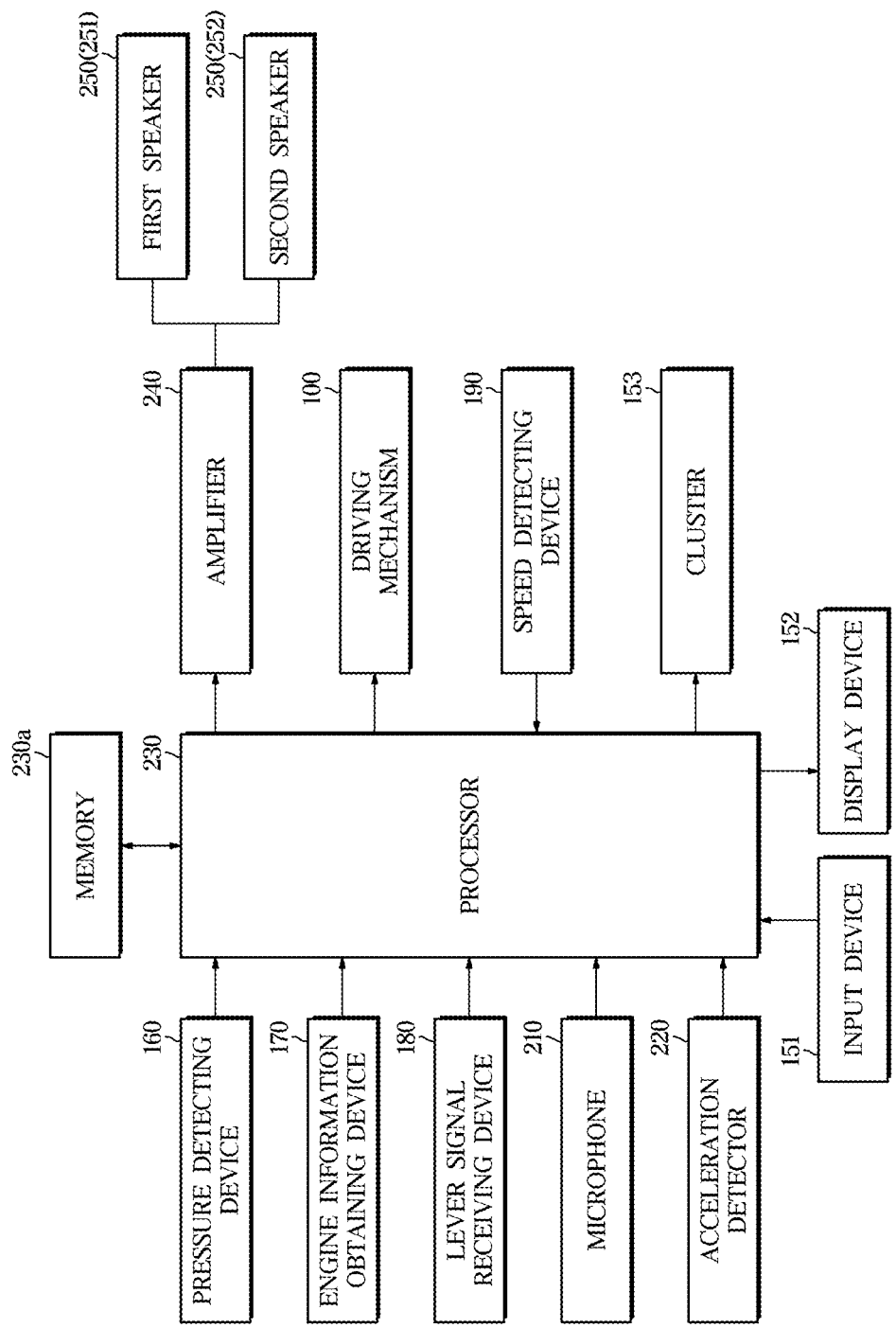
FIG. 2 is a control schematic diagram of the vehicle in which the sound reproducing apparatus according to an exemplary embodiment of the present disclosure is provided.
Figure 4:
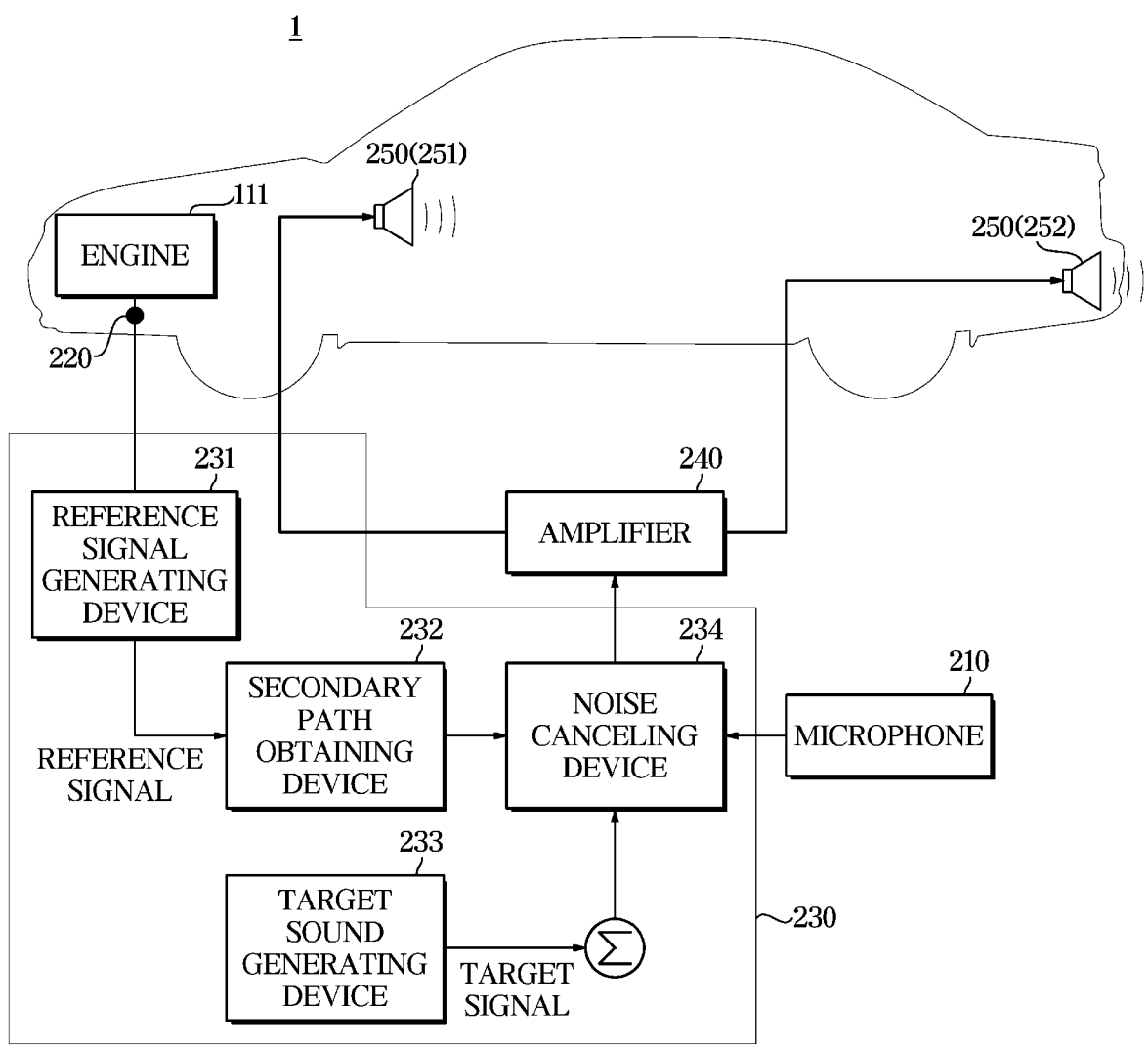
FIG. 4 is a schematic diagram of the sound reproducing apparatus according to an exemplary embodiment of the present disclosure.

FIG. 1 is an exemplary view of a vehicle in which a sound reproducing apparatus according to an exemplary embodiment of the present disclosure is provided, FIG. 2 is a control schematic diagram of the vehicle in which the sound reproducing apparatus according to an exemplary embodiment of the present disclosure is provided, FIG. 3 is an exemplary diagram of a sound reproduction mode reproduced through the sound reproducing apparatus according to an exemplary embodiment of the present disclosure, and FIG. 4 is a schematic diagram of the sound reproducing apparatus according to an exemplary embodiment of the present disclosure.

A vehicle 1 according to an exemplary embodiment of the present disclosure may be an internal combustion engine vehicle or an eco-friendly vehicle.

The vehicle 1 includes a body including an interior and an exterior, and a chassis in which mechanical devices necessary for driving are provided as the remaining portions except for the body.

The exterior of the body includes a front panel, a bonnet, a roof panel, a rear panel, a trunk, front, rear, left and right doors, and windows provided to be opened or closed on the front, rear, left and right doors.

The interior of the body includes seats on which occupants sit, a dashboard, and an instrument panel (that is, a cluster) to display various pieces of information on a state of the vehicle 1 on the dashboard.

The chassis of the vehicle 1, which is a frame for supporting the body, includes front wheels disposed on the left and right in front of the body, respectively, and rear wheels disposed on the left and right in the rear of the body, respectively, and may include a driving mechanism 100 for controlling driving of the vehicle 1.

As illustrated in FIG. 1, the driving mechanism 100 may include a power device 110 for applying a driving force to the front wheels and the rear wheels, a transmission 120 for transmitting the driving force generated by the power device 110 to the wheels, a braking device 130 for applying a braking force to the front, rear, left and right wheels to brake the vehicle 1, and a steering device 140 for changing a driving direction of vehicle 1, and may further include a suspension device configured for adjusting damping of the vehicle 1.

The power device 110, which is a device configured for generating a driving force required for driving of vehicle 1 and adjusting the generated driving force, may include a power generating device configured for generating power and a power transmitting device configured for transmitting the generated power to the wheels.

When the vehicle 1 is an internal combustion engine vehicle, the power generating device may include an engine 111 for applying a driving force to the wheels. When the vehicle 1 is an eco-friendly vehicle, the power generating device may include a motor and may further include the engine 111.

The engine 111 includes a cylinder and a piston, and may generate power for driving the vehicle 1.

An engine controller 112 may control the engine 111 in response to an acceleration intention of the driver through an accelerator pedal 113. For example, the engine controller 112 may control a torque of the engine 111.

The transmission 120 includes a plurality of gears and may transmit power generated by the engine 111 to the wheels.

A shift controller 121 may control the transmission 120 in response to a shift command of the driver through a shift lever 122 (also referred to as a gear lever, shifting lever, or gear shift) and/or a driving speed of the vehicle 1. For example, the shift controller 121 may adjust a shift ratio from the engine 111 to the wheels.

The braking device 130 may decelerate the vehicle 1 or stop the vehicle 1 through friction with the wheels.

The braking controller 131 may control the braking device 130 in response to a braking intention of the driver through a brake pedal 132 and/or slip of the wheels.

The steering device 140 may be operated to change the driving direction of the vehicle 1.

A steering controller 141 may assist the operation of the steering device 140 so that a steering wheel 142 may be easily manipulated in response to a steer intention of the driver through the steering wheel 142.

Electronic components in the vehicle 1 may communicate with each other data through a vehicle communication network NT. For example, the electronic components may transmit and receive date through Ethernet, Media Oriented Systems Transport (MOST), Flexray, Controller Area Network (CAN), Local Interconnect Network (LIN), and the like.

As illustrated in FIG. 2, in addition to the driving mechanism 100, the vehicle 1 may include an input device 151, a display device 152, a cluster 153, a pressure detecting device 160, an engine information obtaining device 170, a lever signal receiving device 180, and a sound reproducing apparatus 200. The sound reproducing apparatus 200 includes a microphone 210, an acceleration detector 220, a processor 230, a memory 231, an amplifier 240, a first speaker 251, and a second speaker 252.

The input device 151 receives a user input. The input device 151 may receive operation commands of various functions which may be performed in the vehicle 1 as user commands.

The input device 151 may receive a command to select the sound reproduction mode.

The input device 151 may also receive information on a level of a sound volume, timbre, and responsiveness of the accelerator pedal 113.

The input device 151 may receive identification information of a user.

The input device 151 may be provided as a touch panel.

The input device 151 may be provided on a head unit and a center fascia, may include at least one physical button, such as a button for turning on/off an operation of various functions and a button for changing a setting value of various functions, and may further include a jog dial or a touch pad for inputting a cursor movement command, an icon or button selection command, and the like displayed on the display device 152.

The input device 151 may include a hardware device such as various buttons or switches, a pedal, a keyboard, a mouse, a track-ball, various levers, a handle, and a stick.

Also, the input device 151 may include a graphical user interface (GUI) such as a touch panel, that is, a software device. The touch panel may be implemented as a touch screen panel (TSP) to form a layer structure with the display device 152.

The display device 152 displays information on a function which is being performed in the vehicle 1 and information input by a user.

The display device 152 may also display selectable information for facilitating user input.

The display device 152 may display the sound reproduction mode selectable by the user.

The display device 152 may display information on a level of the sound volume, the timbre, and the responsiveness of the accelerator pedal 113.

The display device 152 may display the identification information of the user.

The display device 152 may be provided in the head unit and may be provided in a vehicle terminal.

The display device 152 may include a cathode ray tube (CRT), a digital light processing (DLP) panel, a plasma display panel, a liquid crystal display (LCD) panel, an electro luminescence (EL) panel, an electrophoretic display (EPD) panel, an electrochromic display (ECD) panel, a light emitting diode (LED) panel or an organic light emitting diode (OLED) panel, but is not limited thereto.

The display device 152 may be provided as a touch screen in which a touch panel is integrated with a display panel.

As illustrated in FIG. 3, the user interface may display a plurality of sound reproduction modes selectable by the user, and one of the plurality of sound reproduction modes may be selected by the user.

The plurality of sound reproduction modes may include a personal mode, a sports mode, a performance mode, and a racing mode.

The cluster 153 may include a tachometer, a speedometer, a coolant thermometer; a fuel gauge, a turn indicator lamp, a high beam indicator lamp, a warning light, a seat belt warning light, a trochometer, an odometer, an automatic shift selector indicator lamp, a door open warning light, an engine oil warning light, and a fuel shortage warning light.

The cluster 153 may display the sound reproduction mode selected by the user.

The pressure detecting device 160 may detect a pressure applied to the brake pedal 132 and transmit pressure information on the detected pressure to the processor 230. The pressure information may be braking pressure information.

A power information obtaining device configured for obtaining power information for power generated in the vehicle 1 may be further provided.

In the present exemplary embodiment of the present disclosure, a vehicle of an internal combustion engine will be referred to as an exemplary embodiment of the present disclosure, and an engine information obtaining device will be referred to as an example of the power information obtaining device.

The engine information obtaining device 170 may obtain engine operation information. For example, the engine operation information may include engine revolutions per minute (rpm), a throttle opening amount, and a torque of the engine.

Also, the engine information obtaining device 170 may detect the pressure applied to the accelerator pedal 113 and obtain acceleration pressure information on the detected pressure.

The vehicle 1 may further include revolutions per minute (rpm) detecting device configured for detecting the engine rpm, may further include an opening amount detecting device configured for detecting the throttle opening amount, and may further include a torque detecting device configured for detecting the torque of the engine 111.

The lever signal receiving device 180 may receive a lever signal corresponding to a manipulation signal of the shift lever. The lever signal receiving device 180 may receive any one of a forward signal, a reverse signal, a neutral signal, and a parking signal, and may further receive a gear signal corresponding to a gear stage.

The vehicle 1 may further include a speed detecting device 190 for detecting a driving speed of the vehicle 1. The speed detecting device 190 may include a plurality of wheel speed detectors provided on the plurality of wheels, respectively, to detect rotation speeds of the plurality of wheels.

The speed detecting device 190 may include the acceleration detector 220 for detecting an acceleration of the vehicle 1.

The speed detecting device 190 may include both the plurality of wheel speed detectors and acceleration detectors 220 provided on the front, rear, left and right wheels, respectively.

The sound reproducing apparatus 200 may communicate with the engine controller 112, the shift controller 121, the braking controller 131, and the steering controller 141 through a communication network, and may receive vehicle state information from various controllers through a communication network.

The vehicle state information may include driving speed information, engine information, brake pedal pressure information, and shift information, and may further include steering information.

The sound reproducing apparatus 200 may include a communication network.

The sound reproducing apparatus 200 may control the display device 152 to display information on the plurality of sound reproduction modes that a user may select through the display device 152.

The sound reproducing apparatus 200 may generate a sound based on the sound reproduction mode received through the input device 151 and control reproduction of the generated sound.

When it is determined that the sound reproduction mode is the racing mode, the sound reproducing apparatus 200 may generate and output at least one of a driving sound and a post-combustion noise based on at least one of the pressure information detected by the pressure detecting device 160, the engine information obtained from the engine information obtaining device 170, and the lever signal received by the lever signal receiving device 180, and may control an output of at least one of the driving sound and the post-combustion noise based on option information on sound reproduction set through the input device 151.

For example, the sound reproducing apparatus 200 may control an output of at least one of the driving sound and the post-combustion noise including a level corresponding to a volume level input through the input device 151.

The sound reproducing apparatus 200 may output a noise canceling signal for canceling noise.

Various noise sources N may exist in the vehicle 1. For example, in the vehicle 1, a vibrational noise caused by the operation of the internal components such as the engine 111 and the like may occur.

When noise occurs in reproducing the driving sound or the post-combustion noise through the sound reproducing apparatus 200, a user present in the vehicle 1 may not hear the desired driving sound or post-combustion noise due to the noise. Furthermore, the driving sound or the post-combustion noise may be deformed by various factors, such as a window opening, a change in temperature inside the vehicle 1, and a change in engine sound. In the instant case, a negative effect may be caused to the user.

The sound reproducing apparatus 200 may follow and generate a target sound while canceling a noise through an active control logic of an open loop type for feeding back a comparison result between the sound generated by the speakers 251 and 252 and the sound received by the microphone 210 in addition to the noise sources N around the vehicle 1.

The target sound is a sound which may give an effect such as a sense of immersion to the user, and may include at least one of the driving sound and the post-combustion noise. For example, the target sound may be generated based on at least one of the engine rpm, a vehicle speed, tire rpm, wheel rpm, propeller shaft rpm, transmission shaft rpm, an engine intake manifold internal pressure, an engine ignition angle, a change in vehicle speed, and a displacement of an engine mount.

Hereinafter, a case in which the target sound is generated based on the engine rpm, torque, and throttle will be referred to as an example for convenience of description, but embodiments, which will be described later, are not limited thereto.

The sound reproducing apparatus 200 may receive a signal corresponding to a noise of the noise sources N through various detectors, output a sound through the speakers 251 and 252, receive the sound or noise output from the speakers 251 and 252 through the microphone 210, and identify a primary path, which is a path between the noise sources N and the speakers 251 and 252, and a secondary path, which is a path between the speakers 251 and 252 and the microphone 210, based on the active control logic.

The sound reproducing apparatus 200 may provide an effect sound having minimized effects of noise and environmental changes while at the same time canceling the noise based on the identified path.

The engine 111 will be referred to as one example of the noise sources N, but not limited thereto, and the engine 111 may be applied to all of the various noise sources N that generate noises in the vehicle 1.

The sound reproducing apparatus 200 may include the microphone 210, the acceleration detector 220, the processor 230, the memory 231, the amplifier 240, and the first and second speakers 251 and 252.

The microphone 210 detects a noise that the user may hear inside the vehicle 1 and outputs a signal corresponding to the detected noise to the controller 110.

The microphone 210 is provided in the inside of the vehicle 1, and may be provided on a headlining of an internal upper side of the vehicle, or may be provided on at least one of a front windshield, a rear windshield, an overhead console, and a rearview mirror.

One or a plurality of microphones 210 may be provided. Each of the microphones 210 may be directional.

As a device configured for detecting a noise, a microphone array may be provided instead of the microphone 210.

The acceleration detector 220 may be a detector for detecting vibration generated in the vehicle 1.

When the vehicle 1 travels on a road surface, the acceleration detector 220 detects vibration generated due to friction between a tire of the wheel and unevenness of the road surface. Herein, the vibration is a vibration which may be recognized by an occupant inside the vehicle 1.

Vibration may occur at a bottom portion of the body inside the vehicle 1 and outside. The vibration generated at the instant time may be felt by the occupant.

The acceleration detector 220 may detect vibration through driving of the engine 111 or the suspension device and vibration generated by a factor such as wind noise introduced during traveling.

The acceleration detector 220 may indirectly detect an acceleration of the vehicle 1 and a dynamic force such as an impact energy. In addition to the acceleration detector 220, at least one of a gyro detector, a motion detector, a displacement detector, and a torque detector may be used as a detector for detecting vibration of the vehicle 1.

The acceleration detector 220 detects a longitudinal acceleration and a lateral acceleration of the vehicle 1, and detects an acceleration due to a force trying to push the vehicle 1 in a lateral direction and an acceleration due to a force trying to move the vehicle 1 in a vertical direction using driving.

One or a plurality of acceleration detectors 220 may be provided. The acceleration detector 220 may be provided on a front axle or the suspension device.

When a plurality of acceleration detectors 220 is provided, the plurality of acceleration detectors 220 may be provided on left and right sides of an axle connecting the front wheels, and may be provided on the suspension device connected to the left and right front wheels. Herein, the left side of the axle may be a position adjacent to the left front wheel among the axles, and the right side of the axle may be a position adjacent to the right front wheel.

The processor 230 may control the overall operation of the vehicle 1 and may control the overall sound reproduction operation.

The processor 230 may control the cluster so that the engine rpm transmitted through the communication network in the vehicle 1 is displayed on the cluster 153. Through this, the driver may grasp a driving state of the vehicle.

The processor 230 may identify the target sound corresponding to the engine rpm and reproduce the identified target sound.

To reduce or cancel a road noise generated from the road and entering the vehicle interior, the processor 230 generates the noise canceling signal including a phase (anti-phase) opposite to that of a noise signal with respect to the road noise introduced into the vehicle interior and controls an output of the generated noise canceling signal. The anti-phase signal may be a compensation signal generated by use of phase information of a noise signal with respect to an indoor noise. The processor 230 may include a road-noise active noise control (RANC).

When the starting of the vehicle 1 is turned on or it is determined that the vehicle 1 is traveling, the processor 230 may perform a control for noise canceling and reduction.

When an in-vehicle audio device is turned on, the processor 230 may mix an audio signal of the audio device with the noise canceling signal to output the mixed signal.

The processor 230 may output only the noise canceling signal for noise canceling when the audio device is turned off.

The processor 230 for generating the noise canceling signal may obtain a path from a location where the acceleration detector 220 is provided to the speakers 251 and 252 from which sounds are output as the primary path and obtain a path from a location where the speakers 251 and 252 are provided to a location where the microphone 210 is provided as the secondary path, and may generate the noise canceling signal in the secondary path.

The location where the speakers 251 and 252 are provided may be a location where noise is canceled, and the location where the microphone 210 is provided may be a location where residual noise (i.e., corresponding to an error signal) is collected. That is, the secondary path may be a path in which noise exists until it is collected by the microphone 210 after remaining without being not canceled by the sound output from the speakers 251 and 252.

As illustrated in FIG. 4, the processor 230 of the sound reproducing apparatus 200 may include a reference signal generating device 231, a secondary path obtaining device 232, a target sound generating device 233, and a noise canceling device 234.

The reference signal generating device 231 obtains location information of the acceleration detector 220 stored in the memory 231, and generates a reference signal corresponding to an acceleration signal when the obtained location information of the acceleration detector 220 and the acceleration signal detected by the acceleration detector 220 are received.

The acceleration signal detected by the acceleration detector 220 may be an analog signal.

The processor 230 may include an analog-to-digital converter (ADC), and may convert an acceleration signal which is an analog signal into a noise signal which is a digital signal through the analog-to-digital converter.

The reference signal generating device 231 may generate the reference signal corresponding to a noise signal which is a digital signal.

The secondary path obtaining device 232 may include a function of generating the secondary path based on the location information of the acceleration detector 220, location information of the microphone 210, and location information of the speakers 251 and 252.

The secondary path obtaining device 232 obtains the reference signal in the secondary path based on the reference signal obtained by Fast Fourier Transform and the secondary path.

The target sound generating device 233 generates the target sound when it is determined that the sound reproduction mode is the racing mode based on at least one of the pressure information detected by the pressure detecting device 160, the engine information obtained from the engine information obtaining device 170, and the lever signal received by the lever signal receiving device 180. That is, the target sound generating device 233 may generate a target sound signal including at least one of the driving sound and the post-combustion noise (exhaust sound) as the target sound.

The noise canceling device 234 may receive an error signal output from the microphone 210 as feedback.

The noise canceling device 234 obtains an error signal based on the signal received through the microphone 210, generates the noise canceling signal based on the reference signal in the secondary path and the obtained error signal, and outputs the generated noise canceling signal.

A signal received in the microphone 210 may be a signal for a noise remaining after not being canceled by the processor 230 among noises generated by vibration. The noise corresponding to the signal received in the microphone 210 is called error noise or residual noise. The signal received in the microphone 210 may be used as information for determining whether noise in the vehicle 1 is normally reduced or canceled.

The noise canceling device 234 recognizes in advance vibration that causes indoor noise using the acceleration detector 220, recognizes indoor noise using the microphone 210, and generates the noise control signal for noise cancellation based on a noise signal for the recognized vibration (i.e., reference signal) and a noise signal for the recognized noise (error signal).

The noise canceling device 234 may output the target sound signal and the noise canceling signal to the amplifier 240.

The processor 230 may reproduce the consistent driving sound and post-combustion noise regardless of external factors. The processor 230 will be described later.

The driving sound may include a slip sound and an acceleration sound.

The processor 230 may be implemented as a memory for storing an algorithm for controlling the operations of components within the sound reproducing apparatus 200 or data for a program reproducing the algorithm and a processor for performing the operations using data stored in the memory. In the instant case, the memory 230a and the processor 230 may be implemented as separate chips. Alternatively, the memory 230a and the processor 230 may be implemented as a single chip.

The memory 230a stores the location information of one or a plurality of acceleration detectors 220, the location information of one or a plurality of microphones, and the location information of the at least two speakers.

The memory 230a may store identification information of a user and may store information on a driving pattern for each user.

The memory 230a may store option information on sound reproduction set by the user.

The memory 230a may store a plurality of types of post-combustion noise. Each of the types of post-combustion noise may include identification information. The memory 230a may store identification information of the post-combustion noise matched to the identification information of the user, respectively.

The memory 230a may store lateral force information (slip angle) corresponding to a pressing pattern of the brake pedal 132 and lateral force information (slip angle) corresponding to a pressing pattern of the accelerator pedal 113. This may be information obtained by experimentation.

The memory 230a may store information on sleep sounds corresponding to a plurality of sleep rates, respectively.

The memory 230a may store information on a plurality of sleep sounds.

The memory 230a may store information on the pressing pattern of the brake pedal 132 and the pressing pattern of the accelerator pedal 113 matched to the identification information of the user, respectively.

The memory 230a may store information on the acceleration patterns matched to the identification information of the user, respectively.

The memory 230a may store information on the post-combustion noise corresponding to a start state, a first slip sound corresponding to a deceleration command, a second slip sound corresponding to an acceleration command, and an acceleration sound corresponding to an acceleration state.

The memory 230a may also store information on the first slip sound corresponding to a first pressing pattern for each user and the second slip sound corresponding to a second pressing pattern for each user.

The memory 230a may be implemented as at least one of a non-volatile memory device such as a cache, a Read-Only Memory (ROM), a Programmable ROM (PROM), an Erasable Programmable ROM (EPROM), an Electrically Erasable Programmable ROM (EEPROM), and a flash memory, a volatile memory device such as a Random Access Memory (RAM), and a storage medium such as a Hard disk drive (HDD) and a CD-ROM, but is not limited thereto.

The amplifier 240 may amplify and output the noise canceling signal generated by the processor 230.

The amplifier 240 converts the target sound signal into a digital-analog signal, amplifies the converted signal, and outputs the amplified signal through the speakers 251 and 252.

The amplifier 240 may include a digital signal processing device configured for mixing the digital noise canceling signal received from the processor 20 and the target sound signal received from the target sound generating device 233 to generate a digital active noise control sound, a digital power amplifier for converting the digital active noise canceling sound into a digital-analog sound, amplifying the converted sound, and outputting the amplified sound through the speakers 251 and 252.

The active noise canceling sound output through the digital power amplifier may be input back into the microphone and fed back to the processor 230.

The amplifier 240 may generate a mixing signal by mixing the noise canceling signal with a target signal corresponding to a digital target sound source, and may amplify and output the mixed signal.

The amplifier 240 may include an amplification stage for amplifying a mixed signal obtained by mixing the noise control signal and the target signal. The amplification stage may include a vacuum tube or a transistor for amplifying power of the mixed signal, which is an electrical signal.

The mixed signal amplified by the amplifier 240 may be transmitted to the speakers 251 and 252.

The first speaker 251 may be provided in the front or center of the vehicle 1, and the second speaker 252 may be provided in the rear of the vehicle 1.

The first speaker 251 and the second speaker 252 output a sound in response to a control command from the processor 230.

The first speaker 251 may output the driving sound, and the second speaker 252 may output the driving sound and the post-combustion noise.

The first speaker 251 and the second speaker 252 may output a sound for canceling noise.

The speakers 251 and 252 may output the target sound (i.e., exhaust sound) while reducing or canceling indoor noise in the vehicle 1 by outputting the mixed signal amplified from the amplifier 240.

In the instant case, a phase of the noise signal generated inside the vehicle 1 and a phase of the noise canceling signal in the mixed signal may be opposite to each other. Due to the provided configuration, the noise signal generated inside the vehicle 1 may be attenuated. Accordingly, noise in the vehicle 1 may be reduced or canceled.

At least one component may be added or deleted in accordance with the performance of the components of the noise canceling device illustrated in FIGS. 2 and 4. Furthermore, it will be readily understood by those skilled in the art that the mutual positions of the components may be changed in accordance with the performance or structure of the noise canceling device.

Each component illustrated in FIGS. 2 and 4 means software and/or hardware components such as a field programmable gate array (FPGA) and an application specific integrated circuit (ASIC).

A detailed configuration of the processor 230 for generating the target sound will be described with reference to FIGS. 5A, 5B, 6A, 6B, 6C, 7A, 7B, 7C, 8A, and 8B.

When it is determined that the racing mode is selected, the processor 230 may identify a state of the vehicle 1, and generate the post-combustion noise (pops and bangs; launch sound) in response to the start state when it is determined that the identified state of vehicle 1 is the start state, or generate a slip sound in response to the acceleration/deceleration command when it is determined that the state of vehicle 1 is the driving state, or generate an acceleration sound (linearity sound) in response to an acceleration force when it is determined that the vehicle 1 is accelerating in the driving state.

The state of the vehicle 1 may include a stop state, the start state, and the driving state, the driving state may include the acceleration state and a deceleration state, and the acceleration state may include a low-speed state, a medium-speed state, and a high-speed state depending on the acceleration force.

The low-speed state is a state in which the acceleration force is less than or equal to a first reference acceleration force, the medium-speed state is a state in which the acceleration force exceeds the first reference acceleration force and is less than or equal to a second reference acceleration force, and the high-speed state is a state in which the acceleration force exceeds the second reference acceleration force.

The processor 230 may determine the state of the vehicle 1 based on the engine information. For example, the processor 230 may determine whether the vehicle 1 is traveling and an acceleration force based on the throttle opening amount. The processor 230 may determine whether the vehicle 1 is traveling and an acceleration force based on the engine rpm. The processor 230 may determine whether the vehicle 1 is traveling and an acceleration force based on the torque of the engine 111.

That is, the processor 230 may determine whether the vehicle 1 is traveling and an acceleration force based on information on one or more of the throttle opening amount of the engine 111, the engine rpm, and the torque of the engine 111.

The processor 230 may determine whether the vehicle 1 is traveling and an acceleration force based on information on the acceleration pressure applied to the accelerator pedal 113.

The processor 230 may, based on the driving speed information, determine whether the vehicle 1 is in the stop state or the start state, may determine the acceleration force, and may determine whether the acceleration command is input.

The processor 230 may, based on the pressure information applied to the brake pedal 132, determine whether the vehicle 1 is in the stop state or the start state, and may determine whether the deceleration command is input.

When it is determined that the driving speed is changing from zero (0) to an increasing state based on the driving speed information, the processor 230 determines that the state of the vehicle 1 is the start state, generates the post-combustion noise, and controls the output of the generated post-combustion noise.

Figure 5A:
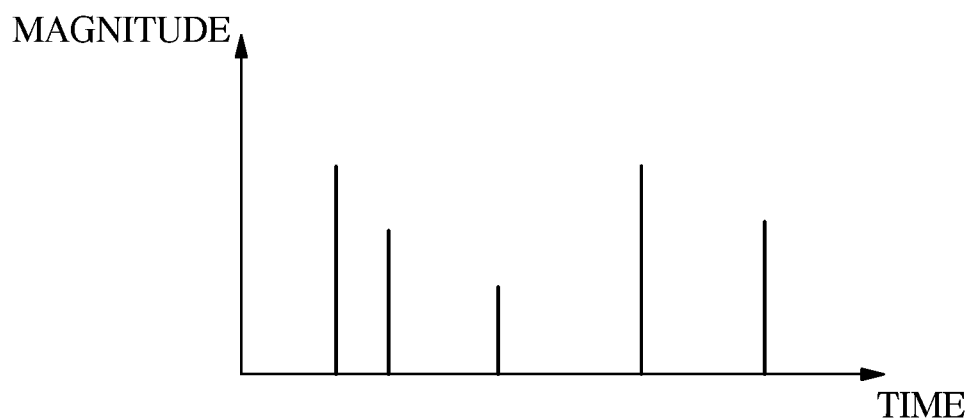
FIG. 5A and FIG. 5B are exemplary diagrams illustrating generation of a post-combustion noise by the sound reproducing apparatus according to an exemplary embodiment of the present disclosure.

As illustrated in FIG. 5A, the processor 230 obtains a signal of the post-combustion noise stored in the memory 231, and processes the obtained signal of the post-combustion noise to generate the post-combustion noise in a form capable of being output through the second speaker 252.

For example, the signal of the post-combustion noise may be a sound source including audio data in a form of a waveform audio format (WAV) which may be reproduced for a preset time.

The processor 230 may control the amplifier 240, the first speaker 251, and the second speaker 252 so that the post-combustion noise is output through the second speaker 252. That is, when controlling the first speaker 251, the processor 230 may adjust a sound pressure of the first speaker 251 so that the sound pressure of the first speaker 251 is equal to or less than a reference sound pressure, and may adjust a sound pressure of the second speaker 252 so that the sound pressure of the second speaker 252 exceeds the reference sound pressure.

As described above, by decreasing the sound pressure of the first speaker 251 at a front side of the vehicle 1 and increasing the sound pressure of the second speaker 252 at a rear side of the vehicle 1, a feeling of a racing vehicle may be provided by a differentiated post-combustion exhaust sound. Accordingly, the quality of user emotion may be improved.

Figure 5B:
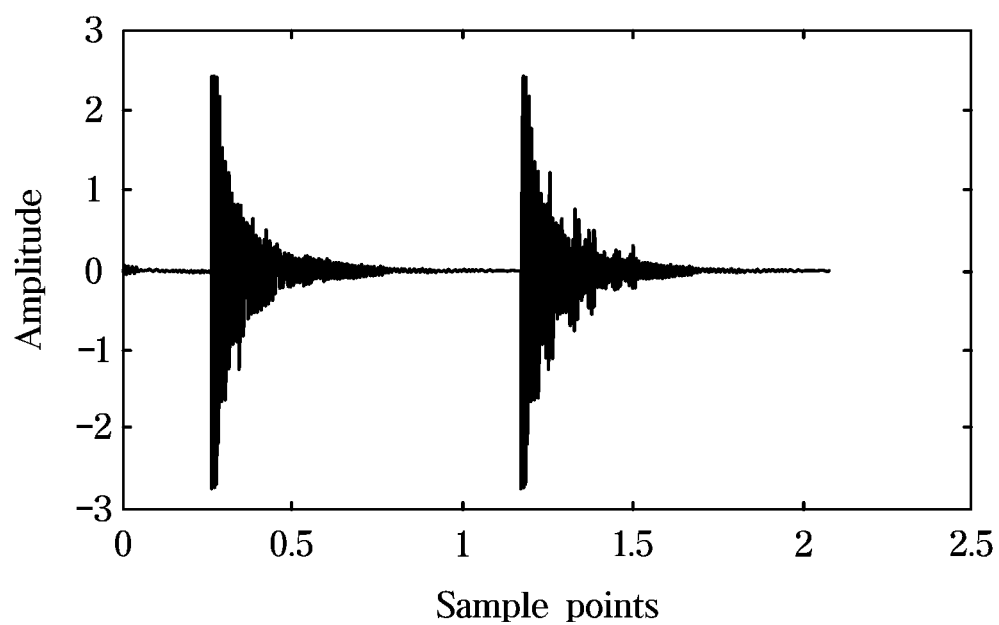

As illustrated in FIG. 5B, the processor 230 may, based on option information on sound reproduction selected by the user, adjust the sound volume and timbre, generate the post-combustion noise including the adjusted sound volume and timbre, and then reproduce the generated post-combustion noise.

The post-combustion noise may be stored for each user to correspond to the selection of the user. In the instant case, the processor 230 may identify the identification information of the user, identify the identification information of the post-combustion noise matched to the identification information of the identified user, and obtain the signal of the post-combustion noise corresponding to the identification information of the identified post-combustion noise.

The processor 230 recognizes the deceleration command in response to the applied pressure of the brake pedal 132, recognizes an acceleration command in response to the applied pressure of the accelerator pedal 113, obtains a slip angle and a slip rate corresponding to the recognized deceleration command or acceleration command, and controls reproduction of the first slip sound or the second slip sound based on the obtained slip angle and slip rate.

The first and second slip sounds may be the same or different from each other.

The processor 230 obtains a first pressing time for which the brake pedal 132 is pressed whenever the vehicle 1 is in the driving state, and a magnitude of a first pressure applied to the brake pedal 132 corresponding to the first pressing time, stores the magnitude of the first pressure corresponding to the obtained first pressing time, and analyzes a change in the magnitude of the first pressure corresponding to the obtained first pressing time, obtaining the pressing pattern of the brake pedal 132 (i.e., the first pressing pattern).

The processor 230 obtains a second pressing time for which the accelerator pedal 113 is pressed whenever the vehicle 1 is in the driving state, and a magnitude of a second pressure applied to the accelerator pedal 113 corresponding to the second pressing time, stores the magnitude of the second pressure corresponding to the obtained second pressing time, and analyzes a change in the magnitude of the second pressure corresponding to the obtained second pressing time, obtaining the pressing pattern of the accelerator pedal 113 (i.e., the second pressing pattern).

The processor 230 may obtain and store the pressing pattern of the brake pedal 132 and the pressing pattern of the accelerator pedal 113 for each user.

The processor 230 obtains lateral force information (slip angle) corresponding to pattern information of the brake pedal 132 obtained based on the lateral force information (slip angle) corresponding to the previously stored pressing pattern of the brake pedal 132.

The processor 230 obtains lateral force information (slip angle) corresponding to pattern information of the accelerator pedal 113 obtained based on the lateral force information (slip angle) corresponding to the previously stored pressing pattern of the accelerator pedal 113.

The processor 230 may obtain a lateral force in the lateral direction based on speeds of the front, rear, left and right wheels detected by the plurality of wheel speed detectors in acceleration or deceleration state, may obtain a lateral force in the lateral direction based on a yaw rate detected by a yaw rate detecting device, and may obtain a lateral force in the lateral direction based on acceleration information detected by the acceleration detector 220.

Figure 6A:
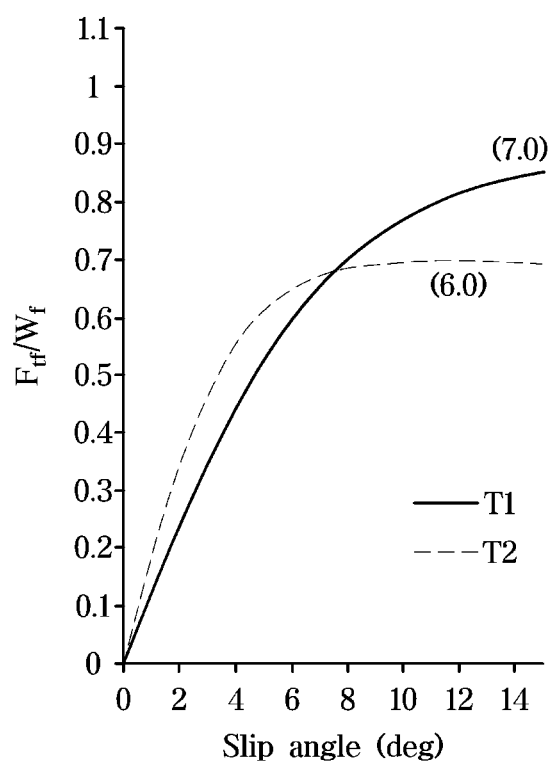
FIG. 6A, FIG. 6B, and FIG. 6C are exemplary diagrams illustrating generation of a slip sound by the sound reproducing apparatus according to an exemplary embodiment of the present disclosure.
Figure 6A:
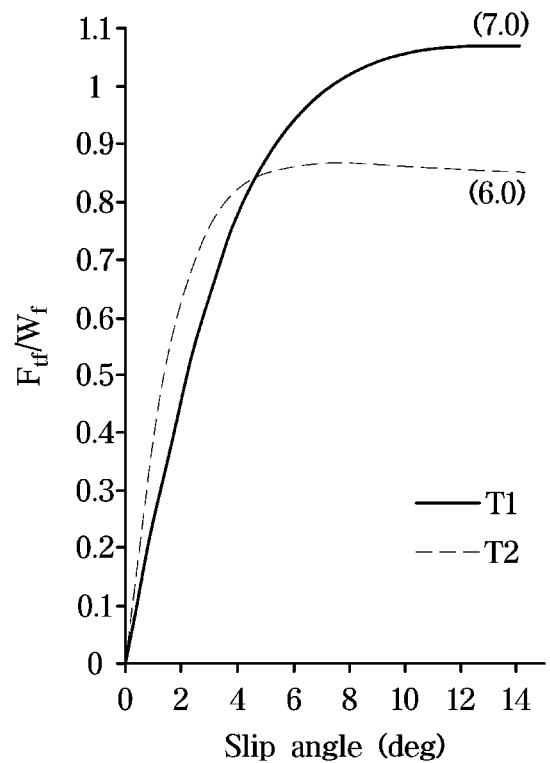

As illustrated in FIG. 6A, the processor 230 may obtain lateral force information of the front wheels and the rear wheels.

Figure 6B:
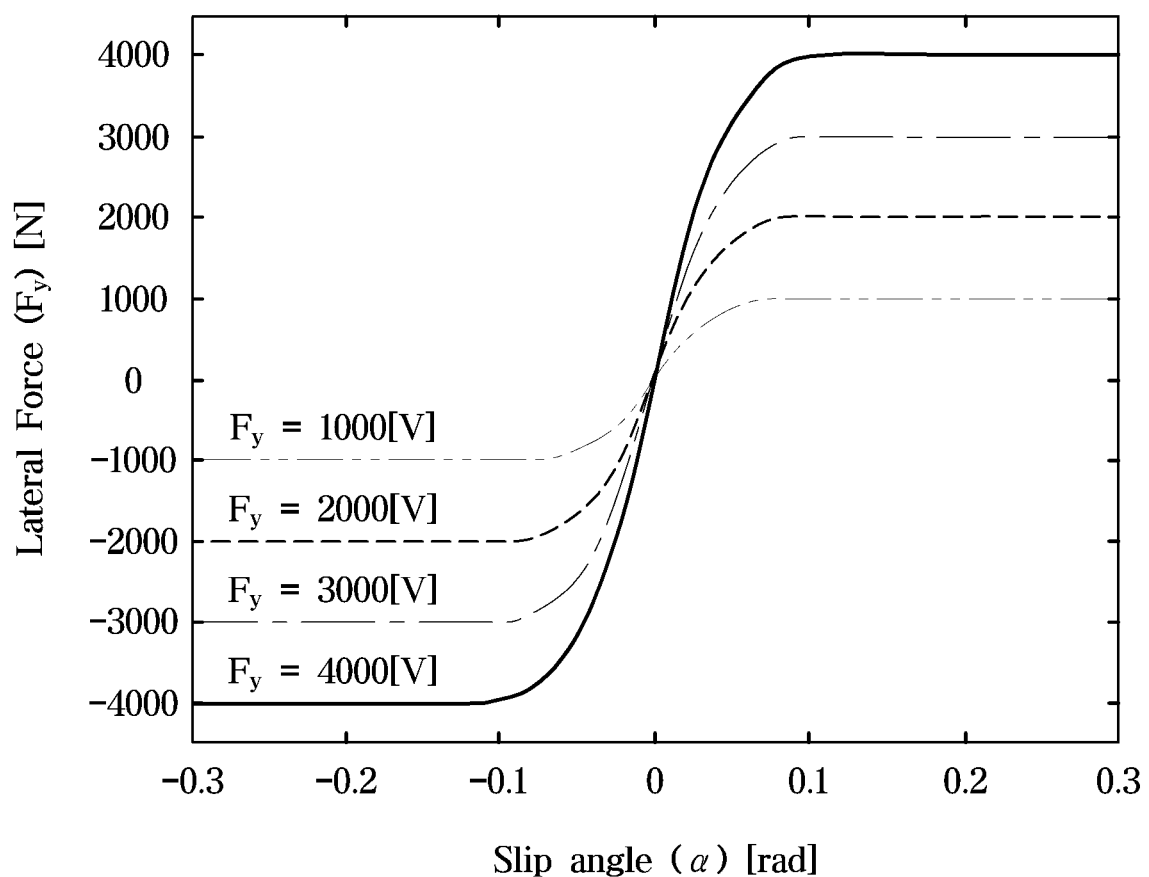

As illustrated in FIG. 6B, the processor 230 converts the obtained slip angles (deg) of the front and rear wheels into radians (rad) and a slip ratio.

Figure 6C:
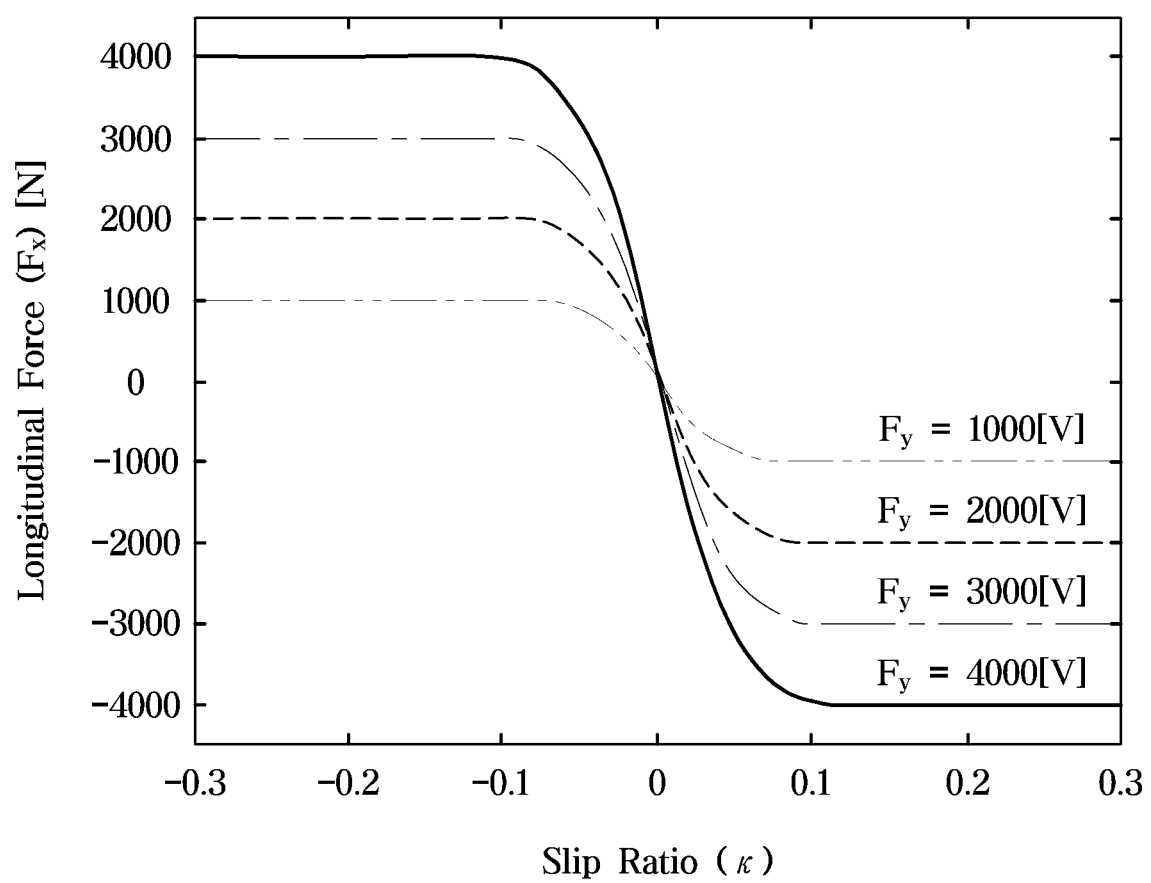

As illustrated in FIG. 6C, the processor 230 generates the first slip sound or the second slip sound corresponding to the converted slip rate, and controls the amplifier 240, the first speaker 251, and the second speaker 252 to output the generated first slip sound or the second slip sound.

The processor 230 may adjust a timbre or resistance of the first slip sound based on the current slip rate and reproduce the adjusted first slip sound when the deceleration command is received, and may adjust a timbre or resistance of the second slip sound based on the current slip rate and reproduce the adjusted second slip sound when the acceleration command is received.

The first and second slip sounds may be slip sounds corresponding to the first and second pressing patterns for each user.

The processor 230 may adjust the timbre and resistance of the slip sound during an acceleration time based on the second pressing pattern of the accelerator pedal 113 of the user, and may adjust the timbre and resistance of the slip sound during a deceleration time based on the pressing pattern of the brake pedal 132 of the user.

Through this, a feeling for cornering may be given.

When it is determined that the vehicle 1 is accelerating in the driving state, the processor 230 may generate the acceleration sound (linearity sound) in response to an acceleration force.

The processor 230 obtains the second pressing time for which the accelerator pedal 113 is pressed whenever the vehicle 1 is in the acceleration state, and the magnitude of the second pressure applied to the accelerator pedal 113 corresponding to the second pressing time, obtains an acceleration force based on the magnitude of the second pressure corresponding to the obtained second pressing time, determines whether the vehicle 1 is in a low acceleration stat, a medium acceleration state, or a high acceleration state based on the obtained acceleration force, and obtains and stores an acceleration pattern corresponding to the determined acceleration state.

The processor 230 may obtain and store an acceleration pattern corresponding to an acceleration force based on the driving speed information and gear stage information.

The processor 230 may obtain the acceleration pattern for each user and store the acceleration pattern matched to the identification information of each user.

When the state of the vehicle 1 is the acceleration state, the processor 230 may correct the acceleration sound based on the acceleration pattern and control reproduction of the corrected acceleration sound.

The processor 230 may stably provide a linearity driving mode to the user while enjoying a feeling of acceleration and an acceleration sound through a power performance-sound pressure correction profile creation technique in a deviation corresponding to a user-specific acceleration pattern.

The processor 230 may, based on the acceleration pattern for each user, automatically generate a sound pressure profile for each engine rpm, a correction profile of the engine rpm and the throttle opening amount (RPM-APS), a vehicle speed profile, and a torque correction profile.

Figure 7A:
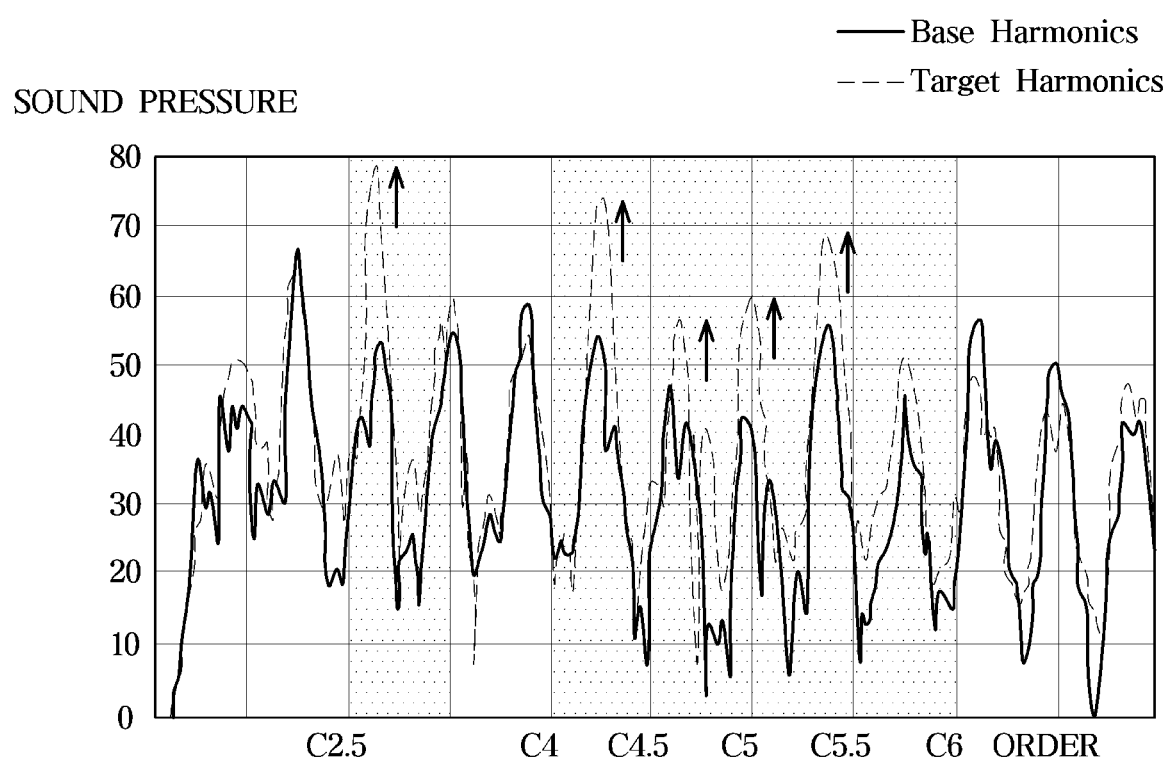
FIG. 7A, FIG. 7B, and FIG. 7C are exemplary diagrams illustrating generation of an acceleration sound by the sound reproducing apparatus according to an exemplary embodiment of the present disclosure.

As illustrated in FIG. 7A, when the vehicle 1 is in the low acceleration state or the high acceleration state, the processor 230 may obtain a sound pressure correction value for each engine rpm by comparing the sound pressures of a basic acceleration sound and a target acceleration sound. The obtained sound pressure correction value may be information of the target sound to be generated by the target sound generating device 233.

Figure 7B:
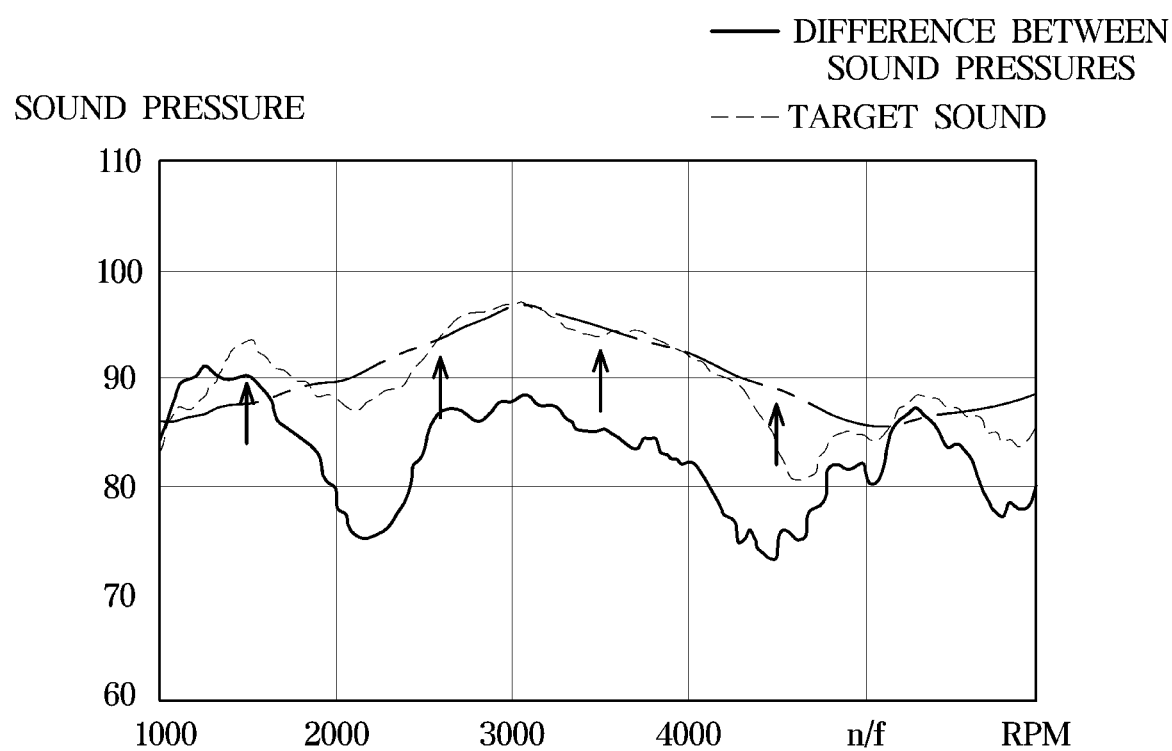

As illustrated in FIG. 7B, the processor 230 compares a sound pressure of the basic acceleration sound for each engine rpm and a sound pressure of the target acceleration sound, identifies a sound pressure difference for each engine rpm corresponding to the comparison result, and generates a sound pressure profile corresponding to each engine rpm based on the identified sound pressure difference.

Figure 7C:
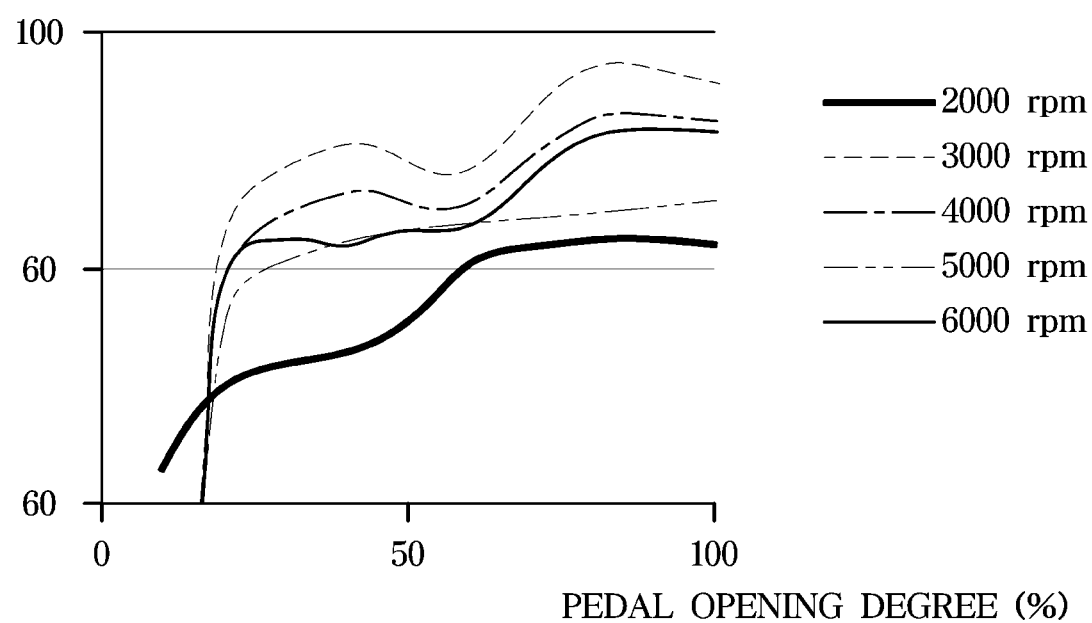

As illustrated in FIG. 7C, the processor 230 generates a graph of the basic acceleration sound for each engine rpm and each throttle opening amount of the engine 111, selects one of these (i.e., one of the engine rpms and one of the throttle opening amounts), and generates a sound pressure profile based on the selected engine rpm and the throttle opening amount of the engine 111.

Through this, an acceleration sound in which a deviation depending on a slow acceleration or a sudden acceleration according to a driving type of the user is corrected may be provided.

Figure 8A:
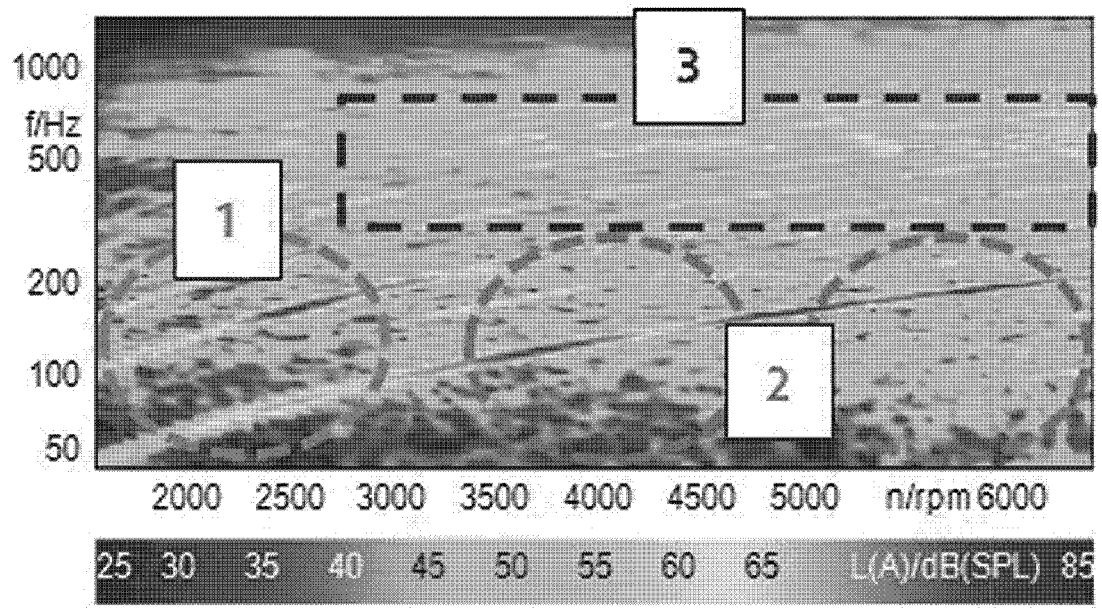
FIG. 8A and FIG. 8B are exemplary diagrams of frequency spectra of a racing sound and a rally sound of the sound reproducing apparatus according to an exemplary embodiment of the present disclosure.
Figure 8B:
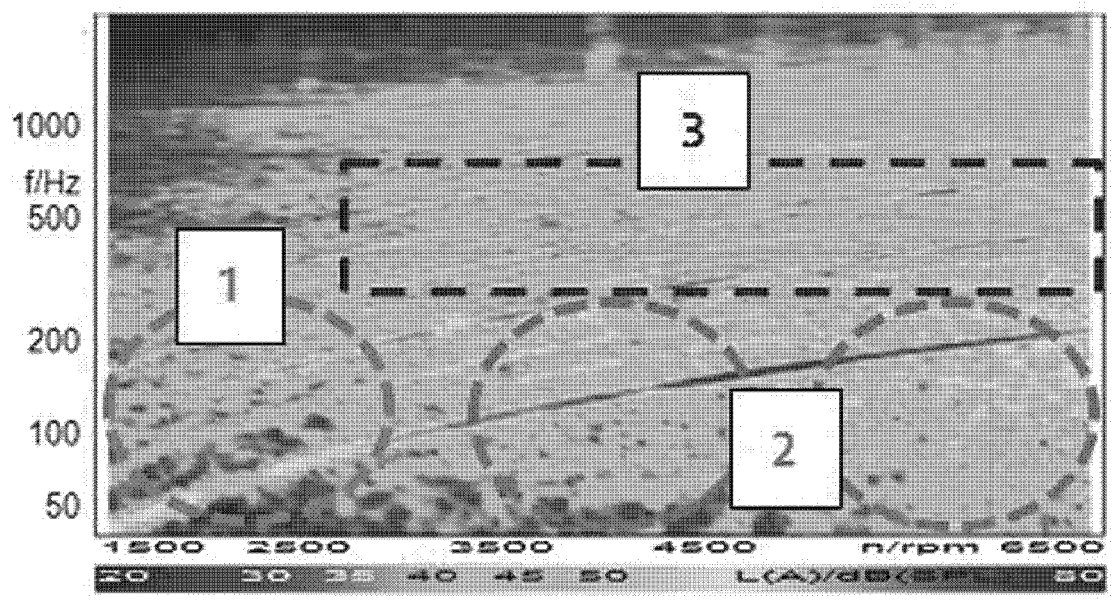

FIG. 8A and FIG. 8B are exemplary diagrams of spectra of a frequency and a sound pressure for each engine rpm corresponding to output of a racing sound and a rally sound of the sound reproducing apparatus according to an exemplary embodiment of the present disclosure.

As illustrated in FIG. 8A, when the sound reproduction mode is the racing mode, region 1 represents a spectrum of a frequency and a sound pressure for each engine rpm corresponding to the post-combustion noise, region 2 represents a spectrum of a frequency and a sound pressure for each engine rpm corresponding to the slip sound, and region 3 represents a spectrum of a frequency and a sound pressure for each engine rpm corresponding to the linearity acceleration sound.

As illustrated in FIG. 8B, when the sound reproduction mode is the rally mode, region 1 represents the spectrum of the frequency and the sound pressure for each engine rpm corresponding to the post-combustion noise, region 2 represents the spectrum of the frequency and the sound pressure for each engine rpm corresponding to the slip sound, and region 3 represents the spectrum of the frequency and the sound pressure for each engine rpm corresponding to the linearity acceleration sound.

The processor 230 may reproduce various sounds related to racing.

The processor 230 may identify a target sound corresponding to the personal mode when the sound reproduction mode is the personal mode and control reproduction of the identified target sound, may identify a target sound corresponding to the sports mode when the sound reproduction mode is the sports mode and control reproduction of the identified target sound, and may identify a target sound corresponding to the performance mode when the sound reproduction mode is the performance mode and control reproduction of the identified target sound.

According to an exemplary embodiment of the present disclosure, sounds in various vehicles may be implemented with one vehicle, and marketability of the vehicle may be improved.

The present disclosure may reflect diverse needs of customers by outputting a high-performance vehicle racing sound and may make drivers feel a virtual sound of a race vehicle or championship.

Herein, the disclosed exemplary embodiments of the present disclosure may be implemented in a form of a recording medium storing instructions executable by a computer. The instructions may be stored in a form of program code, and when executed by a processor, a program module may be generated to perform the operations of the disclosed exemplary embodiments of the present disclosure. The recording medium may be implemented as a computer-readable recording medium.

The computer-readable recording medium includes various kinds of recording media in which instructions which may be decrypted by a computer are stored. For example, there may be a Read-Only Memory (ROM), a Random Access Memory (RAM), a magnetic tape, a magnetic disk, a flash memory, an optical data storage device, and the like.

As is apparent from the above, the present disclosure can improve user satisfaction and improve marketability by outputting post-combustion noise or driving sound output from various types of vehicles with one vehicle.

The present disclosure can reflect diverse needs of customers by outputting a high-performance vehicle racing sound and can make drivers drive with the feel of a high-performance car, a race vehicle or championship.

The present disclosure can prevent the cost increase for racing sound output by outputting a racing sound using existing devices.

The present disclosure may be implemented even in an eco-friendly vehicle, providing users with various sounds, such as the post-combustion noise, without generating soot.

The present disclosure can provide users with excellent effect sounds without quality deviation, regardless of a change in driving environment.

For convenience in explanation and accurate definition in the appended claims, the terms "upper", "lower", "inner", "outer","up", "down", "upwards", "downwards", "front", "rear","back","inside", "outside", "inwardly","outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A sound reproducing apparatus comprising:
   a communication network configured to receive vehicle state information; and
   a processor configured to determine whether a vehicle is in a start state or a driving state according to the vehicle state information received through the communication network, to control reproduction of post-combustion noise when the processor concludes that the vehicle is in the start state, to control reproduction of a slip sound in response to an acceleration command or a deceleration command when the processor concludes that the vehicle is in the driving state, and to control reproduction of an acceleration sound corresponding to an acceleration force when the processor concludes that the vehicle is accelerating in the driving state.

2. The sound reproducing apparatus of claim 1, wherein the vehicle state information includes at least one of driving speed information, engine information, brake pedal pressure information, and shift information.

3. The sound reproducing apparatus of claim 1, further including
   an input device configured to receive at least one of sound volume information and timbre information on sound reproduction,
   wherein the processor, when controlling the reproduction of the post-combustion noise, is configured to adjust at least one of a sound volume and a timbre of the post-combustion noise according to the at least one of the sound volume information and the timbre information received in the input device, and to control reproduction of the adjusted post-combustion noise.

4. The sound reproducing apparatus of claim 1, further including
   a memory configured to store information on a plurality of slip sounds,
   wherein the processor is configured to obtain a first pressing pattern in which a brake pedal of the vehicle is pressed and a second pressing pattern in which an accelerator pedal of the vehicle is pressed, according to the vehicle state information, and to store information on a first slip sound corresponding to the obtained first pressing pattern and a second slip sound corresponding to the obtained second pressing pattern among the plurality of slip sounds, in the memory.

5. The sound reproducing apparatus of claim 4, wherein when the deceleration command is received, the processor is configured to adjust a timbre of the first slip sound based on a slip rate of each wheel of the vehicle and to control reproduction of the adjusted first slip sound.

6. The sound reproducing apparatus of claim 5, wherein when the acceleration command is received, the processor is configured to adjust a timbre of the second slip sound based on the slip rate of each wheel of the vehicle and to control reproduction of the adjusted second slip sound.

7. The sound reproducing apparatus of claim 6, wherein the processor is configured to identify at least one information of wheel speed information, yaw rate information, and acceleration information of each wheel in the vehicle state information, and to obtain the slip rate of each wheel according to the identified at least one information.

8. The sound reproducing apparatus of claim 1, wherein when controlling the reproduction of the acceleration sound, the processor is configured to identify at least one information of engine rpm, a torque of an engine, and a throttle opening amount of the engine of the vehicle state information, to obtain the acceleration force according to the identified at least one information, and to correct a sound pressure of the acceleration sound according to the obtained acceleration force.

9. The sound reproducing apparatus of claim 8, wherein the processor is configured to correct the sound pressure of the acceleration sound when the acceleration force is equal to or less than a first acceleration force or exceeds a second acceleration force higher than the first acceleration force.

10. The sound reproducing apparatus of claim 1, further including:
a memory; and
an input device configured to receive user identification information,
wherein the processor is configured to identify at least one information of engine rpm, a torque of an engine, and a throttle opening amount of the engine of the vehicle state information, to obtain an acceleration pattern for each user according to the identified at least one information and the user identification information, to correct a sound pressure of the acceleration sound for each user according to a difference in sound pressure comparing the sound pressure of the acceleration sound corresponding to the acceleration pattern for each user and a basic sound pressure, and to store information on the corrected sound pressure of the acceleration sound in the memory.

11. The sound reproducing apparatus of claim 1, further including:
a microphone;
an acceleration detector; and
a speaker,
wherein the processor is configured to generate a noise canceling signal based on a signal received in the microphone, an acceleration signal detected by the acceleration detector, and a sound output from the speaker, and to control an output of the generated noise canceling signal.

12. A vehicle comprising:
a speed detecting device configured to detect a driving speed;
a pressure detecting device configured to detect a pressure applied to a brake pedal of the vehicle;
a power information obtaining device configured to obtain power information of a power device; and
a sound reproducing apparatus configured to determine whether the vehicle is in a start state or a driving state according to driving speed information detected by the speed detecting device, pressure information detected by the pressure detecting device, and the power information, to control reproduction of post-combustion noise when the sound reproducing apparatus concludes that the vehicle is in the start state, to control reproduction of a slip sound in response to an acceleration command or a deceleration command when the sound reproducing apparatus concludes that the vehicle is in the driving state, and to control reproduction of an acceleration sound corresponding to an acceleration force when the sound reproducing apparatus concludes that the vehicle is accelerating in the driving state.

13. The vehicle of claim 12, further including
an input device configured to receive at least one of sound volume information and timbre information on sound reproduction,
wherein the sound reproducing apparatus, when controlling the reproduction of the post-combustion noise, is configured to adjust at least one of a sound volume and a timbre of the post-combustion noise according to the at least one of the sound volume information and the timbre information received in the input device, and to control reproduction of the adjusted post-combustion noise.

14. The vehicle of claim 12, wherein the sound reproducing apparatus, when controlling the reproduction of the slip sound, is configured to control reproduction of a first slip sound when the sound reproducing apparatus concludes that the deceleration command is received in response to pressing of a brake pedal of the vehicle, and to control reproduction of a second slip sound when the sound reproducing apparatus concludes that the acceleration command is received in response to pressing of an accelerator pedal of the vehicle.

15. The vehicle of claim 14, wherein the sound reproducing apparatus is configured to:
identify at least one information of wheel speed information, yaw rate information, and acceleration information of each wheel of the vehicle and obtain a slip rate of each wheel based on the identified at least one information, and
adjust a timbre of the first slip sound based on the obtained slip rate of each wheel when controlling the reproduction of the first slip sound and adjust a timbre of the second slip sound based on the obtained slip rate of each wheel when controlling the reproduction of the second slip sound.

16. The vehicle of claim 12, wherein the power device includes an engine and further includes a transmission.

17. The vehicle of claim 16, wherein the sound reproducing apparatus, when controlling the reproduction of the acceleration sound, is configured to identify at least one information of engine rpm, a torque of an engine, and a throttle opening amount of the engine, to obtain the acceleration force according to the identified at least one information, and to correct a sound pressure of the acceleration sound according to the obtained acceleration force.

18. The vehicle of claim 17, wherein the sound reproducing apparatus is configured to correct the sound pressure of the acceleration sound when the acceleration force is equal to or less than a first acceleration force or exceeds a second acceleration force higher than the first acceleration force.

19. The vehicle of claim 16, further including:
a memory; and
an input device configured to receive user identification information,
wherein the sound reproducing apparatus is configured to identify at least one information of engine rpm, a torque of an engine, and a throttle opening amount of the engine, to obtain an acceleration pattern for each user according to the identified at least one information and the user identification information, to correct a sound pressure of an acceleration sound for each user according to a difference in sound pressure comparing the sound pressure of the acceleration sound corresponding to the acceleration pattern for each user and a basic sound pressure, and to store information on the corrected sound pressure of the acceleration sound in the memory.

20. The vehicle of claim 12, further including:
a microphone;
an acceleration detector; and
a speaker,
wherein the sound reproducing apparatus is configured to generate a noise canceling signal based on a signal received in the microphone, an acceleration signal detected by the acceleration detector, and a sound output from the speaker, and to control an output of the generated noise canceling signal.

* * * * *